United States Patent
Kazandjian et al.

(10) Patent No.: US 12,372,620 B2
(45) Date of Patent: Jul. 29, 2025

(54) SENSOR ASSEMBLY WITH DEFLECTOR

(71) Applicant: Ford Global Technologies, LLC, Dearborn, MI (US)

(72) Inventors: Vahan Kazandjian, Warrington, PA (US); Segundo Baldovino, Novi, MI (US); Venkatesh Krishnan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 518 days.

(21) Appl. No.: 17/552,061

(22) Filed: Dec. 15, 2021

(65) Prior Publication Data

US 2023/0184895 A1    Jun. 15, 2023

(51) Int. Cl.
| | |
|---|---|
| G01S 7/481 | (2006.01) |
| B60R 11/04 | (2006.01) |
| B60S 1/54 | (2006.01) |
| G01D 21/02 | (2006.01) |
| G01S 7/02 | (2006.01) |
| G02B 27/00 | (2006.01) |

(52) U.S. Cl.
CPC ............ *G01S 7/4813* (2013.01); *B60R 11/04* (2013.01); *B60S 1/54* (2013.01); *G01D 21/02* (2013.01); *G01S 7/027* (2021.05); *G01S 7/481* (2013.01); *G02B 27/0006* (2013.01)

(58) Field of Classification Search
CPC ... B60R 11/00; B60R 11/04; B60R 2011/004; B60R 2011/0085; B60R 2011/0092; G01S 7/4813; G01S 17/931; G01S 2013/93273; G01S 7/481; G01S 2007/4977; G01S 2007/4975; G01D 21/02; B60S 1/0848; B60S 1/56; G02B 27/0006

USPC ........................................................ 73/112.01
See application file for complete search history.

(56) References Cited

U.S. PATENT DOCUMENTS

| | | | | |
|---|---|---|---|---|
| 5,097,563 | A | * | 3/1992 | Cowan ...................... B60S 1/56 |
| | | | | 15/313 |
| 10,179,549 | B2 | | 1/2019 | Buss |
| 2018/0056756 | A1 | * | 3/2018 | Schaal ..................... F24F 13/10 |
| 2019/0101749 | A1 | * | 4/2019 | Nakashima ........ G02B 27/0006 |

(Continued)

FOREIGN PATENT DOCUMENTS

| | | | | |
|---|---|---|---|---|
| CN | 1547496 | A | * 11/2004 | ............ A61M 16/06 |
| CN | 110435553 | A | * 11/2019 | |
| CN | 209600413 | U | 11/2019 | |

(Continued)

OTHER PUBLICATIONS

JP-2009083730 Apr. 23, 2009 (Year: 2009).*

(Continued)

*Primary Examiner* — Peter J Macchiarolo
*Assistant Examiner* — Monica S Young
(74) *Attorney, Agent, or Firm* — Frank A. MacKenzie; Brooks Kushman P.C.

(57) ABSTRACT

A sensor assembly includes a housing including an outlet. The sensor assembly includes a sensor window, the sensor window fixed relative to the housing, and the outlet aimed across the sensor window. The sensor assembly includes a flap rotatably coupled to the housing at the outlet. The sensor assembly includes a deflector covering the flap. The flap is disposed between the outlet and the deflector and rotatable toward and away from the deflector.

20 Claims, 7 Drawing Sheets

(56) References Cited

U.S. PATENT DOCUMENTS

2020/0238955 A1   7/2020  Walsoe et al.
2020/0247329 A1   8/2020  Robertson, Jr. et al.

FOREIGN PATENT DOCUMENTS

| CN | 113500025 A | * | 10/2021 | |
|----|-------------|---|---------|---|
| CN | 118182397 A | * | 6/2024  | ............... B08B 5/02 |
| DE | 102017122476 A1 | * | 4/2018 | ............... B08B 5/02 |
| EP | 2631734 A1 | * | 8/2013 | ............ B60S 1/0848 |
| EP | 2845773 B1 | * | 9/2021 | ............ B60S 1/0848 |
| JP | 2005208311 A | * | 8/2005 | |
| JP | 2009083730 A | * | 4/2009 | |
| JP | 2020136246 A | * | 8/2020 | ............. B05B 1/005 |

OTHER PUBLICATIONS

JP_2020136246 Feb. 26, 2019 (Year: 2019).*
EP_2845773 (Year: 2019).*
CN_1547496 (Year: 2004).*

* cited by examiner

SENSOR ASSEMBLY WITH DEFLECTOR

BACKGROUND

Vehicles can include a variety of sensors. Some sensors detect internal states of the vehicle, for example, wheel speed, wheel orientation, and engine and transmission values. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back.

DETAILED DESCRIPTION

A sensor assembly includes a housing including an outlet. The sensor assembly includes a sensor window. The sensor window is fixed relative to the housing. The outlet is aimed across the sensor window. The sensor assembly includes a flap rotatably coupled to the housing at the outlet. The sensor assembly includes a deflector covering the flap, the flap disposed between the outlet and the deflector and rotatable toward and away from the deflector.

The sensor assembly may include a member fixed to the housing and positioned to limit movement of the flap toward the deflector.

The sensor assembly may include a plurality of flaps including the flap, the flaps each being rotatable toward and away from the deflector.

The outlet may be elongated parallel to the sensor window alongside the sensor window in a direction of elongation, and the flaps are arranged in series along the direction of elongation of the outlet.

The flaps may be spaced from each other along the direction of elongation.

The flaps may be rotatable independently of each other.

The flap includes nay include vanes extending from an external surface toward the deflector.

The outlet may be elongated parallel to the sensor window alongside the sensor window in a direction of elongation, and the vanes the vanes may be elongated perpendicular to the direction of elongation of the outlet.

The flap may include second vanes extending from an internal surface away from the deflector.

The vanes may be triangular in cross section.

The deflector and the flap may define an air flow passage between the deflector and the flap.

The outlet may define a second air flow passage, the flap between the air flow passage and the second air flow passage.

The air flow passage may extend from a first end of the deflector to a second end of the deflector.

The flap may be between the first end and the second end of the deflector.

The outlet of the housing may be between the first end and the second end of the deflector.

The deflector may extend from the first end toward the sensor window to the second end.

The sensor assembly may include a base, the housing rotatably coupled to the base to rotate about an axis, the second end radially inward of the first end relative to the axis.

The housing may include a cylindrical panel, and the sensor window may be recessed from the cylindrical panel.

The housing may include a recess panel extending radially inward from the cylindrical panel toward the sensor window, and the recess panel may include the outlet.

The outlet and the flap may be elongated parallel to an axis defined by the cylindrical panel.

With reference to the Figures, wherein like numerals indicate like parts throughout the several views, a sensor assembly 20, e.g., for collecting data to autonomously operate a vehicle 22, includes a housing 24 including an outlet 26. The sensor assembly 20 includes a sensor window 30, the sensor window 30 is fixed relative to the housing 24. The outlet 26 is aimed across the sensor window 30. The sensor assembly 20 includes a flap 32 rotatably coupled to the housing 24 at the outlet 26. The sensor assembly 20 includes a deflector 34 covering the flap 32, the flap 32 disposed between the outlet 26 and the deflector 34 and rotatable toward and away from the deflector 34. The deflector 34 may deflect air across and/or toward the flap 32. Airflow across and/or toward the flap 32 may rotate the flap 32, e.g., away from the deflector 34. Rotation of the flap 32 may variably impede airflow through the outlet 26. As a result, the airflow reaching the sensor window 30 may be pulsed, i.e., fluctuates up and down in terms of velocity. The pulsed airflow can be more effective than constant airflow at removing small water droplets from the sensor window 30. Keeping the sensor window 30 clearer of water and/or debris may provide more accurate data from, e.g., a sensing device 28.

Figure 1:
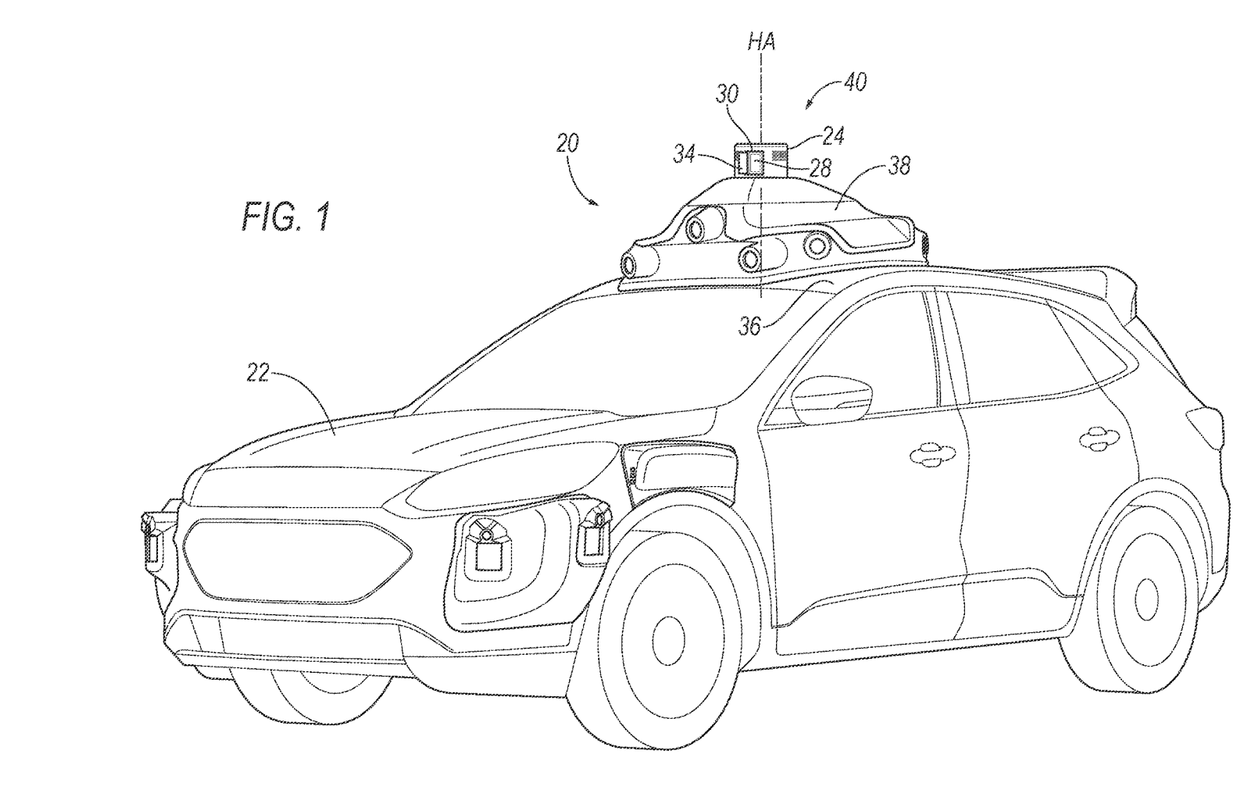
FIG. 1 is a perspective view of an example vehicle with a sensor assembly.

With reference to FIG. 1, the vehicle 22 may be any passenger or commercial automobile such as a car, a truck, a sport utility vehicle, a crossover, a van, a minivan, a taxi, a bus, etc.

The vehicle 22 may be an autonomous vehicle. A computer can be programmed to operate the vehicle 22 independently of the intervention of a human operator, completely or to a lesser degree. The computer may be programmed to operate the propulsion, brake system, steering system, and/or other vehicle systems based in part of data received from the sensing devices 28. For the purposes of this disclosure, autonomous operation means the computer controls the propulsion, brake system, and steering system without input from a human operator; semi-autonomous operation means the computer controls one or two of the propulsion, brake system, and steering system and a human operator controls the remainder; and nonautonomous operation means a human operator controls the propulsion, brake system, and steering system.

The vehicle 22 includes a body. The vehicle 22 may be of a unibody construction, in which a frame and the body of the vehicle 22 are a single component. The vehicle 22 may, alternatively, be of a body-on-frame construction, in which the frame supports the body that is a separate component from the frame. The frame and body may be formed of any suitable material, for example, steel, aluminum, etc. The body includes body panels partially defining an exterior of the vehicle 22. The body panels may present a class-A surface, e.g., a finished surface exposed to view by a customer and free of unaesthetic blemishes and defects. The body panels include, e.g., a roof 36, etc.

The sensor assembly 20 includes a casing 38 attachable to the vehicle 22, e.g., to one of the body panels of the vehicle 22, e.g., the roof 36. For example, the casing 38 may be shaped to be attachable to the roof 36, e.g., may have a shape matching a contour of the roof 36. The casing 38 may be attached to the roof 36, which can provide the sensing devices 28 with an unobstructed field of view of an area around the vehicle 22. The casing 38 may be formed of, e.g., plastic or metal.

Figure 2:
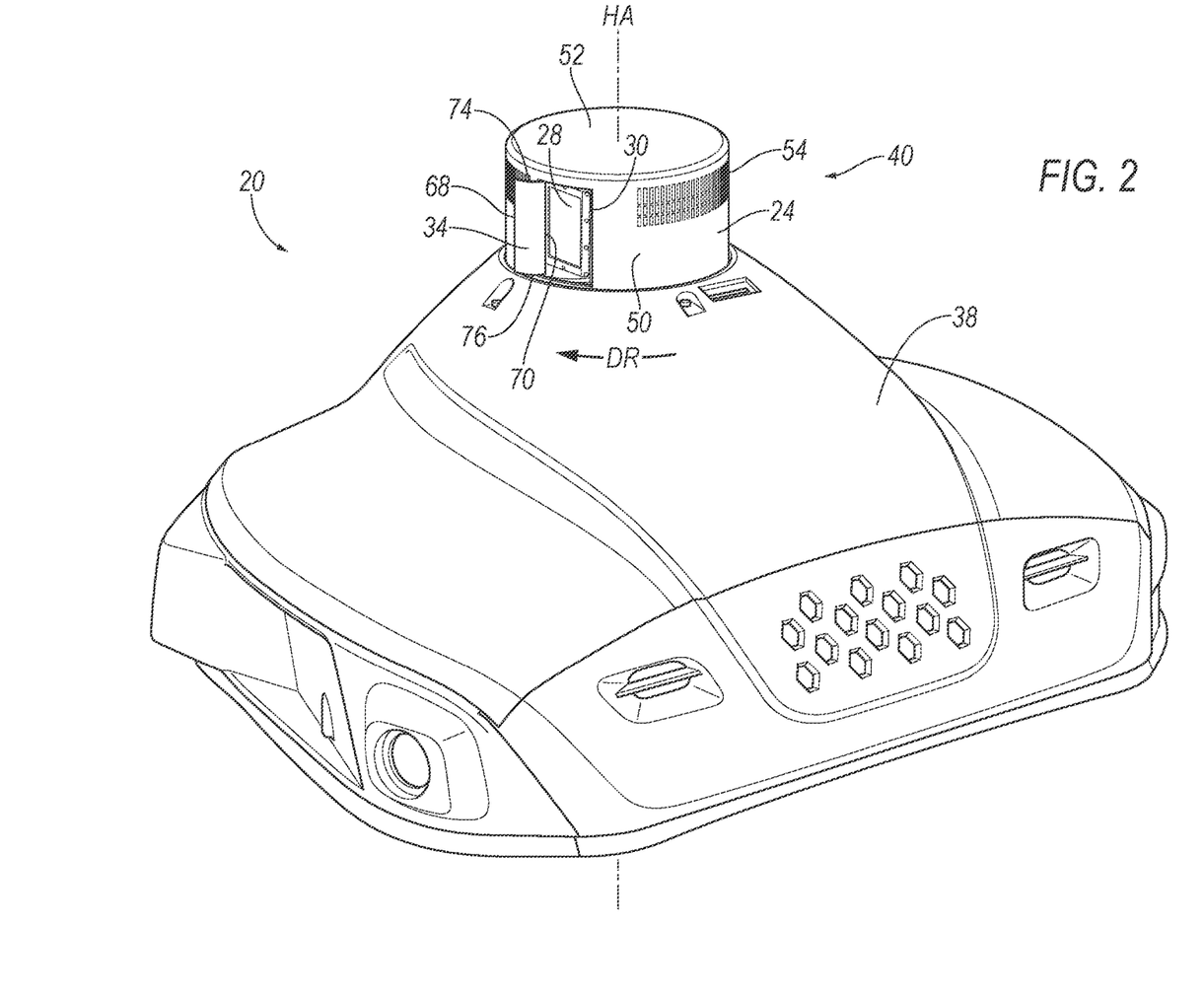
FIG. 2 is a rear perspective view of the sensor assembly.

With reference to FIG. 2, a sensor unit 40 and the housing 24 supported by the casing 38 are shown. The sensor unit 40 can be disposed on top of the casing 38 at a highest point of the casing 38. The casing 38 includes an aperture through which the sensor unit 40 passes. The aperture is round, e.g., has a circular or slightly elliptical shape. The aperture is centered on a housing axis HA. The aperture of the casing 38 is a highest point of the casing 38.

Figure 3:
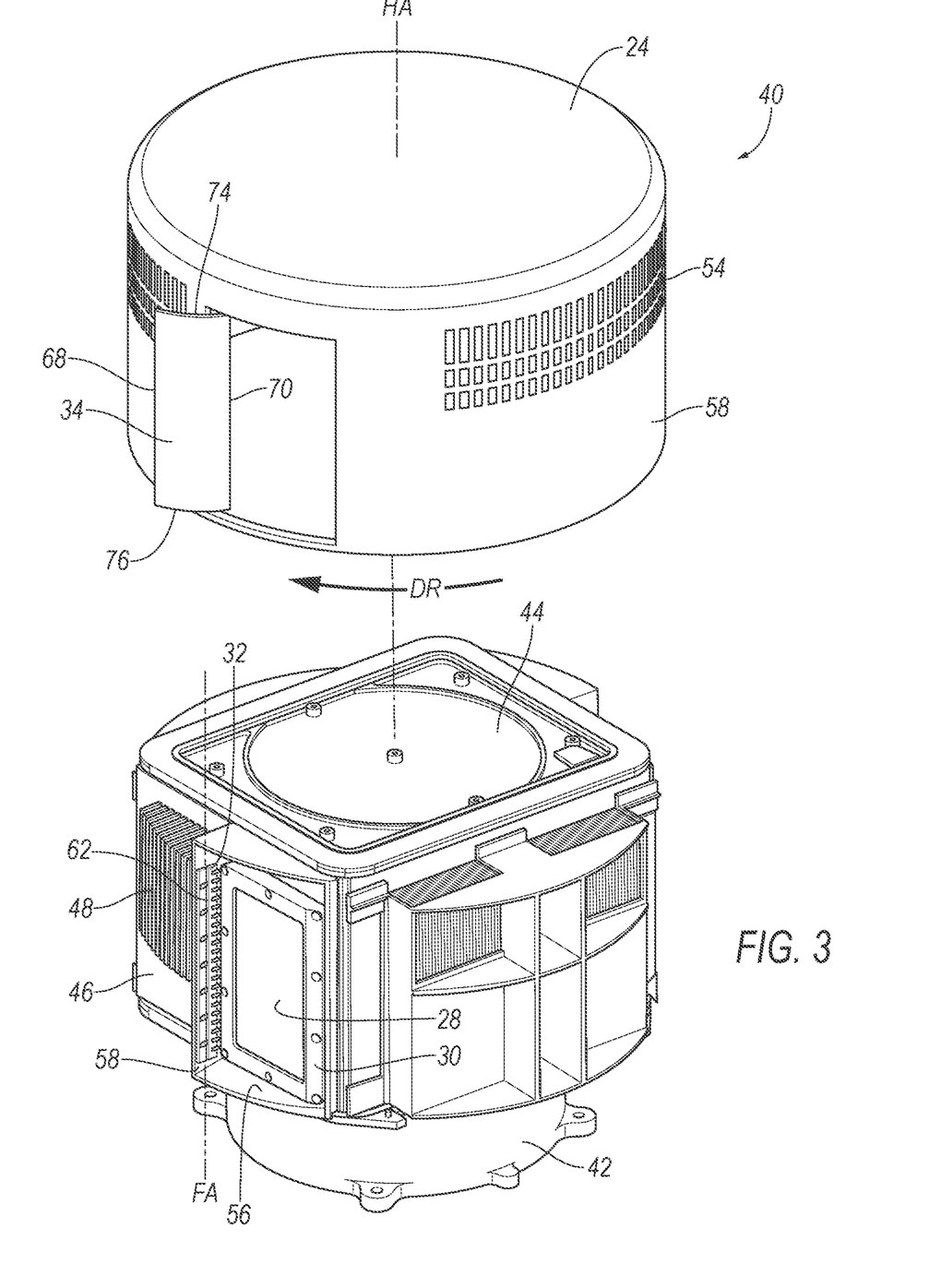
FIG. 3 is an exploded perspective view of a sensor unit of the sensor assembly.

With reference to FIG. 3, the sensor unit 40 includes a base 42, a motor, a sensor body 44, at least one sensing device 28, the at least one sensor window 30, and the housing 24. The base 42 is attached to and fixed relative to the casing 38. The motor is attached to and fixed relative to the base 42. The sensor body 44, the at least one sensing device 28, the at least one sensor window 30, and the housing 24 are fixed relative to each other and are rotatably coupled to the base 42 to rotate about the housing axis HA relative to the casing 38, e.g., by being rotatably drivably coupled to the motor.

The motor is fixed relative to the base 42 and drivably coupled to the sensor body 44 and thereby drivably coupled to the housing 24. The motor can be any suitable type for rotating the sensing devices 28, e.g., an electric motor. For example, the motor can include a stator (not shown) fixed relative to the base 42 and a rotor (not shown) rotatable by the stator around the housing axis HA and fixed relative to the sensor body 44.

The sensor body 44 includes walls 46, e.g., four vertical walls 46 as shown in the Figures, and a top panel. The walls 46 can have the same horizontal length, i.e., the walls 46 can form a square horizontal cross-section. The horizontal cross-section can be centered on the housing axis HA, i.e., the housing axis HA intersects a geometric center of the horizontal cross-section of the sensor body 44, making the rotation of the sensor body 44 balanced. The top panel extends horizontally to each wall 46. The sensing devices 28 are contained inside the sensor body 44. The sensor body 44 is positioned inside the housing 24 and fixed relative to the housing 24.

The sensor body 44 includes a plurality of fins 48. The fins 48 are positioned on the walls 46. The fins 48 are oriented parallel to the housing axis HA, i.e., axially relative to the housing axis HA, e.g., elongated vertically along the respective wall 46 for the housing axis HA being vertical. The fins 48 can be positioned on all of the walls 46. The fins 48 on each wall 46 extend parallel to each other. The fins 48 can extend perpendicularly from the respective wall 46. Each fin 48 has a length following a direction of elongation of the fin 48 along the wall 46, a width perpendicular to the wall 46, and a thickness in a horizontal direction along the wall 46. The fins 48 extend along their respective widths radially outward relative to the housing axis HA from the sensor body 44 toward the housing 24. The length can be significantly greater than the width, e.g., more than twice as great. The width can be significantly greater than the thickness, e.g., more than five times as great. The fins 48 can be integral with the walls 46, i.e., made of a single, uniform piece of material with no seams, joints, fasteners, or adhesives holding it together.

The fins 48 are thermally conductive, i.e., have a high thermal conductivity, e.g., a thermal conductivity equal to at least 15 watts per meter-Kelvin (W/(m K)), e.g., greater than W/(m K), at 25° C. For example, the fins 48, along with the walls 46, may be aluminum. The high thermal conductivity of the fins 48 helps transfer away heat generated by the sensing devices 28 inside the sensor body 44, as does the large surface area created by the geometry of the fins 48.

The sensor unit 40 may be designed to detect features of the outside world; for example, the sensor unit 40 may be a radar sensor, a scanning laser range finder, a light detection and ranging (LIDAR) device, or an image processing sensor such as a camera. In particular, the sensor unit 40 may be a LIDAR device, e.g., a scanning LIDAR device. A LIDAR device detects distances to objects by emitting laser pulses at a particular wavelength and measuring the time of flight for the pulse to travel to the object and back. The operation of the sensor unit 40 is performed by the at least one sensing device 28, e.g., a LIDAR sensing device, inside the sensor body 44. For example, the sensor unit 40 can include two sensing devices 28. The sensing devices 28 have fields of view through the sensor windows 30 encompassing a region from which the sensor unit 40 receives input. As the sensing devices 28 rotate, the fields of view encompass a horizontal 360° around the vehicle 22.

The sensor unit 40 can include at least one sensor window 30, e.g., two sensor windows 30, one sensor window 30 for each sensing device 28. The sensor windows 30 may be components of the sensing devices 28 or may be separate from the sensing devices 28. The sensor windows 30 are each positioned on one of the walls 46. Each sensor window 30 can be off-center on the respective wall 46. For example, the sensor window 30 can be positioned closer to a trailing edge of the respective wall 46 than a leading edge of the wall 46 with respect to a direction of rotation DR of the sensor body 44. For example, each sensor window 30 can be positioned in a trailing half of the respective wall 46 with respect to the direction of rotation DR. The sensor windows 30 can be flat. For example, the sensor windows 30 can have a rectangular shape. The sensor windows 30 are transparent with respect to whatever medium the sensing device 28 is capable of detecting. For example, if the sensor unit 40 is a LIDAR device, then the sensor windows 30 are transparent with respect to visible light at the wavelength generated and detectable by the sensing devices 28.

The housing 24 is rotatably coupled to the base 42 to rotate about the housing axis HA. For example, the housing 24 may be fixedly attached to the sensor body 44, e.g., fastened to the top panel of the sensor body 44. The housing 24 is rotatable around the housing axis HA relative to the casing 38, along with the sensor body 44.

The housing 24 includes a cylindrical panel 50 and an end panel 52. The end panel 52 is flat and has a circular shape. The end panel 52 is attached, e.g., fastened, to the top panel of the sensor body 44. The cylindrical panel 50 has a cylindrical shape defining the housing axis HA, which is vertical. The cylindrical panel 50 has a constant circular cross-section extending upward along the housing axis HA from a lower edge to the end panel 52. The housing 24 is open at the lower edge, thereby permitting airflow into the sensor unit 40 and attachment of the sensor unit 40.

The cylindrical panel 50 includes a plurality of slits 54. The slits 54 extend through the cylindrical panel 50 and are elongated parallel to the housing axis HA. The slits 54 can be positioned radially outward from the fins 48 and are elongated parallel to the fins 48. As described below, the slits 54 permit airflow to exit from the housing 24.

The sensor windows 30 are recessed from the cylindrical panel 50. The housing 24 of the sensor unit 40 includes window recesses 56 extending from the sensor window 30 and from the respective wall 46 radially outward to the cylindrical panel 50. The window recesses 56 can be integral with the cylindrical panel 50 or a separate piece from the cylindrical panel 50. Each window recess 56 can include a first recess panel 58, a second recess panel, a third recess panel, and a fourth recess panel. The recess panels extend radially inward from the cylindrical panel 50 toward the sensor window 30. The first recess panel 58 and the second recess panel extend vertically upward from the third recess panel to the fourth recess panel. The first recess panel 58 can be positioned in the direction of rotation DR of the sensor body 44 from the respective sensor window 30, i.e., as the sensor body 44 rotates, each first recess panel 58 leads the respective sensor window 30. The second recess panel can be positioned on an opposite side of the sensor window 30 from the first recess panel 58. The second recess panel can be positioned opposite the direction of rotation DR of the sensor body 44 from the respective sensor window 30, i.e., as the sensor body 44 rotates, each sensor window 30 leads the respective second recess panel.

Figure 4:
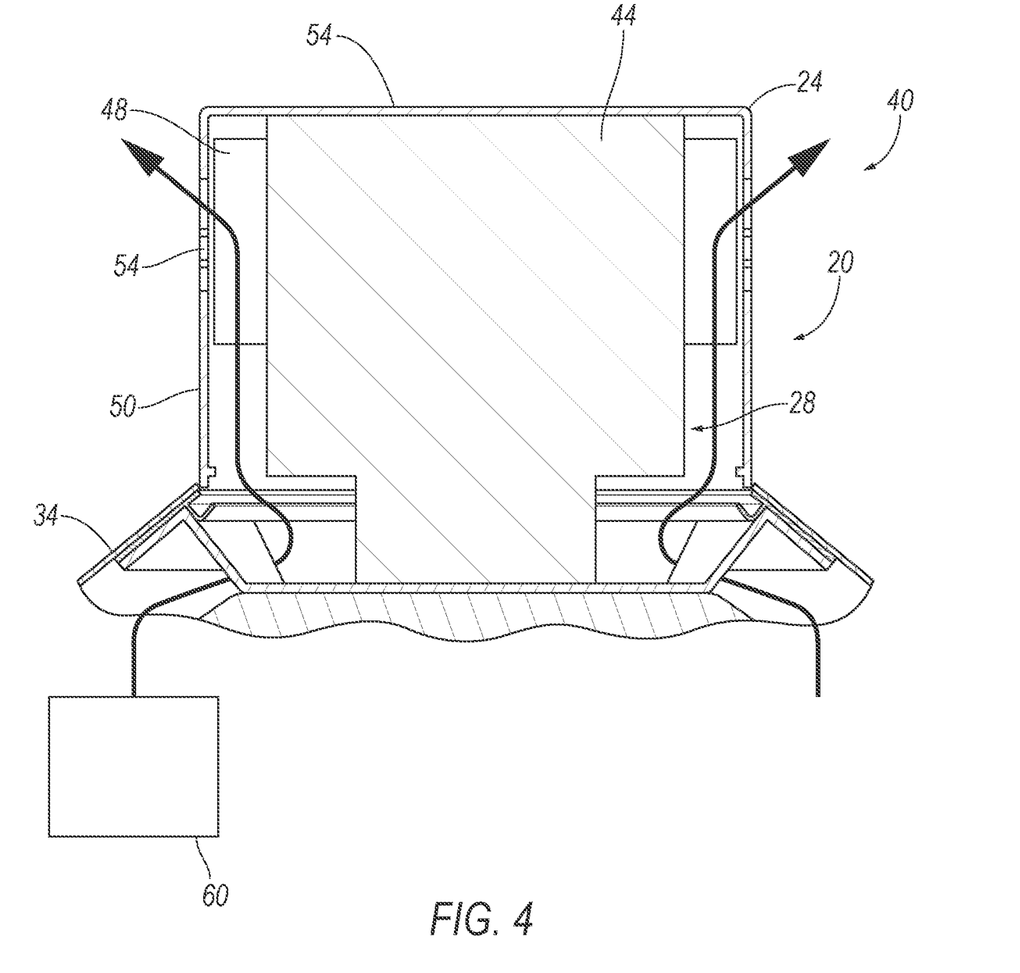
FIG. 4 is a diagrammatic side cross-sectional view of a portion of the sensor assembly.

With reference to FIG. 4, the sensor assembly 20 includes a pressurized-air source 60. The pressurized-air source 60 can be positioned inside the casing 38. The pressurized-air source 60 may be any suitable type of blower, e.g., a fan, or suitable type of compressor, e.g., a positive-displacement compressor such as a reciprocating, ionic liquid piston, rotary screw, rotary vane, rolling piston, scroll, or diaphragm compressor; a dynamic compressor such as an air bubble, centrifugal, diagonal, mixed-flow, or axial-flow compressor; or any other suitable type.

The pressurized-air source 60 is positioned to discharge airflow through the aperture of the casing 38 and into the housing 24 at the lower edge. The lower edge is positioned to receive airflow from the casing 38. The fins 48 and the slits 54 are positioned to receive airflow traveling upward from the lower edge. For example, airflow that passes from the casing 38 through the lower edge passes between the fins 48 and then exits the sensor unit 40 through the slits 54 and the outlets 26. The airflow thus transfers heat from the sensor body 44, thereby cooling the sensor body 44 and the sensing devices 28. The airflow is vertical through the lower edge, and the vertical orientation of the fins 48 and the slits 54 facilitates smooth airflow.

Figure 5:
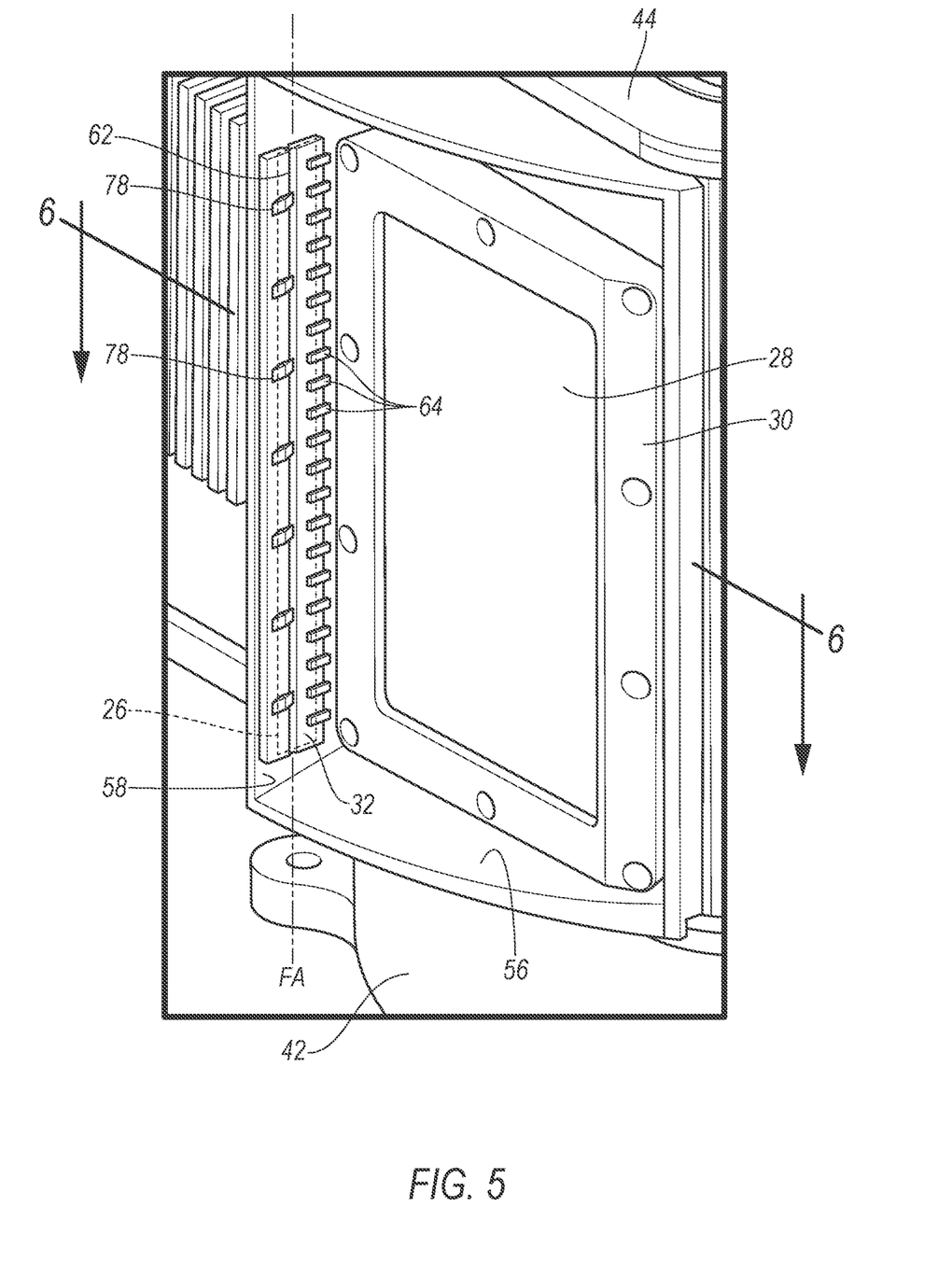
FIG. 5 is a perspective view of a portion of the sensor unit including a sensor window that is recessed.

With reference to FIG. 5, the window recesses 56 include the outlets 26 positioned to direct airflow entering the housing 24 across the sensor windows 30. For example, the outlets 26 may define outlet air flow passages OP though which air may flow from inside the housing 24 to outside the housing 24 toward the windows 30. For example, the first recess panels 58 can include the respective outlets 26. The outlets 26 can be positioned in the direction of rotation DR of the sensor body 44 from the respective sensor windows 30, i.e., as the sensor body 44 rotates, each outlet 26 leads the respective sensor window 30. The outlets 26 can be aimed across the respective sensor windows 30. The outlets 26 can be elongated parallel to the respective sensor windows 30 alongside the sensor windows 30, e.g., in a direction of elongation. The outlet 26, e.g., the direction of elongation, can be elongated parallel to the housing axis HA. The outlets 26 can extend vertically for a height of the respective sensor windows 30.

A plurality of the flaps 32 are positioned at each outlet 26. The flaps 32 are disposed between the outlet 26 and the deflector 34 and rotatable toward and away from the deflector 34, e.g., between a first position shown in FIG. 6A and a second position shown in FIG. 6B. Each flap 32 is rotatably coupled to the housing 24 at the respective outlet 26, e.g., is rotatably coupled to the respective first recess panel 58 to rotate toward and away from the deflector 34. For example, the flaps 32 can be integral with the first recess panel 58 and can rotate about a living hinge 62 positioned at the radially outer edge of the outlet 26. The flaps 32 and the housing 24 may by unitary. Unitary means a single, uniform piece of material with no seams, joints, fasteners, or adhesives holding it together, i.e., formed together simultaneously as a single continuous unit, e.g., by machining from a unitary blank, molding, forging, casting, etc. Non-unitary components, in contrast, are formed separately and subsequently assembled, e.g., by threaded engagement, welding, etc. Alternatively, each flap 32 can be freely rotatable about a pin (not shown) that is positioned at a radially outer edge of the outlet 26 relative to the housing axis HA. The flaps 32 at each outlet 26 can be rotatable about a single flap axis FA that is parallel to the housing axis HA defined by the cylindrical panel 50, e.g., that is parallel to the direction of elongation of the outlet 26. The flaps 32 are rotatable independently of each other.

Figure 6A:
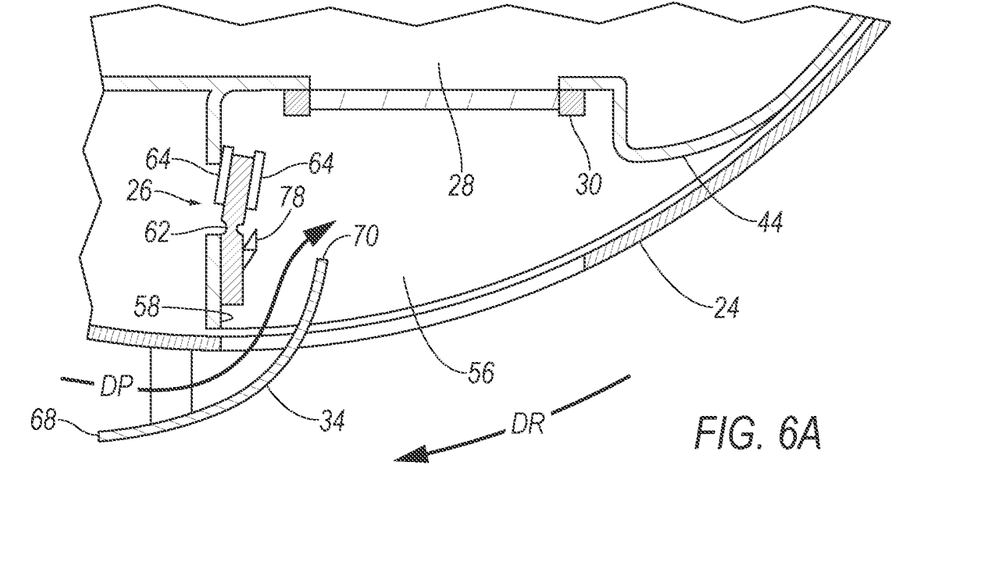
FIG. 6A is a top cross-sectional view of a portion of the sensor unit with a flap in a first position.
Figure 6B:
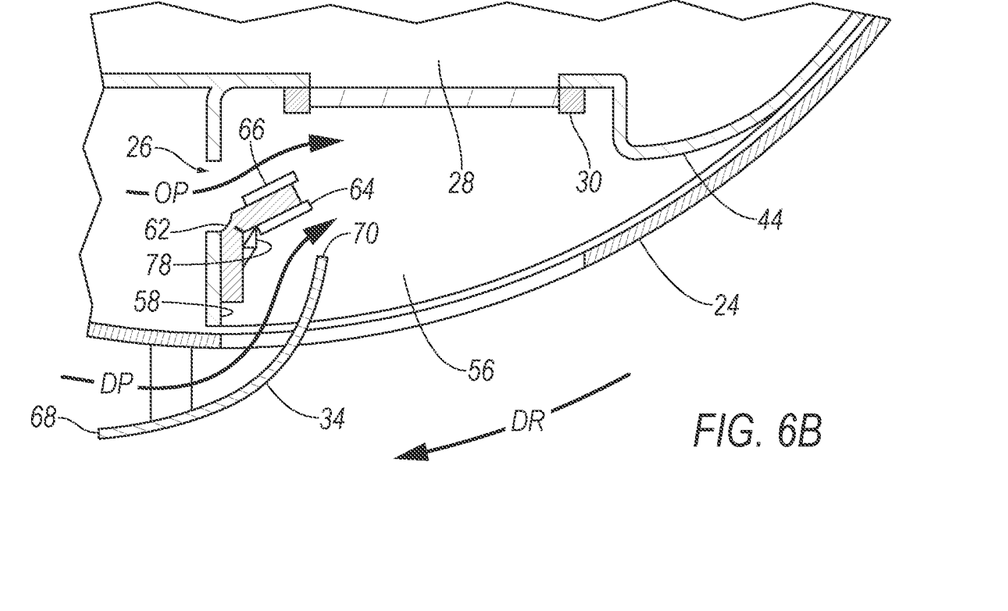
FIG. 6B is a top cross-sectional view of the portion of the sensor unit with the flap in a second position.

The flaps 32 can have the same shape as each other. The flaps 32 can have a generally flat shape. The flaps 32 can extend vertically parallel to the flap axis FA and can extend radially outward from the flap axis FA. A length of each flap 32 radially outward from the flap axis FA can be greater than a width of the respective outlet 26, i.e., than a dimension of the outlet 26 perpendicular to the direction of elongation of the outlet 26.

Figure 7:
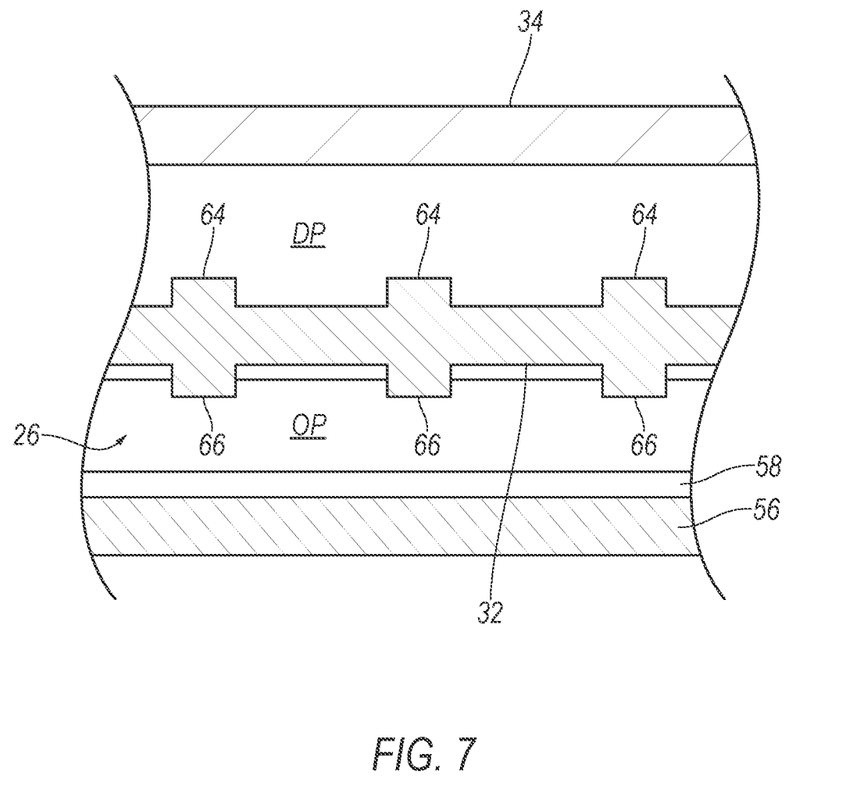
FIG. 7 is a side-cross section of the flap in the second position.

With reference to FIG. 7, the flaps 32 can include first vanes 64 extending from an external surface of the respective flap 32 toward the deflector 34. The flaps 32 can include second vanes 66 extending from an internal surface of the respective flap 32 away from the deflector 34. The first vanes 64 and the second vanes 66 can be positioned to guide airflow horizontally past the flap 32. The first vanes 64 and the second vanes 66 can be elongated perpendicular to the direction of elongation of the outlet 26, e.g., circumferentially about the housing axis HA. The first vanes 64 and the second vanes 66 may be triangular in cross section, or any other suitable shape.

Returning to FIGS. 3, 6A and 6B, the sensor assembly 20 can include a plurality of deflectors 34, e.g., one at each of the sensor windows 30. The deflectors 34 cover the flaps 32, e.g., radially outward of the respective flap 32 relative to the housing axis HA. The deflectors 34 direct air toward the respective sensor window 30. Each deflector 34 may extend from a first end 68 to a second end 70. Each deflector 34 may extend from the first end 68 toward the sensor window 30 to the second end 70. The first end 68 may be circumferentially spaced from the second end 70 about the housing axis HA. The first end 68 may be forward of the second end 70 relative to the direction of rotation DR of the sensor body 44. The first end 68 may be radially spaced from the cylindrical panel 50. The second end 70 may be radially spaced from the respective sensor windows 30. The second end 70 may be radially inward of the first end 68 relative to the housing axis HA. The deflectors 34 may be fixed to the housing 24, e.g., via one or more ribs 72, or any other suitable structure. The deflectors 34 and the housing 24 may be unitary.

The flaps 32 may be between the first end 68 and the second end 70 of the deflectors 34. The outlets 26 of the housing 24 may be between the first end 68 and the second end 70 of the deflectors 34. In other words, the deflector 34 may extend from in front of to behind the respective flaps 32 and outlets 26 relative to the direction of rotation DR of the sensor body 44. Each deflector 34 may extend from a top end 74 to a bottom end 76. The top end 74 may be spaced from the bottom end 76 along, e.g., parallel to, the housing axis HA. The deflector 34 may extend parallel to the housing axis HA from above the flaps 32 to below the flaps 32. For example, the top end 74 may be above the flaps 32 and the bottom may be below the flaps 32.

The deflectors 34 and the respective flaps 32 may each define a deflector air flow passage DP therebetween. The deflector air flow passage DP may extend from the first end 68 of the deflector 34 to the second end 70 of the deflector 34. For example, rotation of the sensor body 44 in the direction of rotation DR of the sensor body 44 may ram air into the deflector air flow passage DP at the spacing between the first end 68 of the deflector 34 and the cylindrical panel 50. Such air may travel through the deflector air flow passage DP along the exterior surface of the flaps 32, out of the deflector air flow passage DP at the spacing between second end 70 of the deflector 34 and the sensor window 30, and across the sensor window 30. The flaps 32 may be between the deflector air flow passage DP and the outlet air flow passage OP. Air flow out of the outlet 26 via the second passage may flow along the interior surface of the flaps 32 and across the sensor window 30. The air flow through the deflector air flow passage DP and the outlet air flow passage OP along the exterior surface and the interior surface of the flaps 32 may cause the flaps 32 to oscillate e.g., cyclically rotate about the flap axis FA toward and away from the deflector 34.

The sensor assembly 20 may include a member 78 fixed to the housing 24. The member 78 may include a rib or any other suitable structure to limit movement of one or more of the flaps 32. The members 78 may be positioned to limit movement of the flap 32 toward the deflector 34. For example, the member 78 may be fixed to the housing 24 radially outward of the flap 32 and extend rearward of, the hinge supporting the respective flap 32. The flap 32 in the second position may abut the member 78, and be thereby limited in movement.

The disclosure has been described in an illustrative manner, and it is to be understood that the terminology which has been used is intended to be in the nature of words of description rather than of limitation. The adjectives "first," "second," "third," and "fourth" are used throughout this document as identifiers and are not intended to signify importance, order, or quantity. Many modifications and variations of the present disclosure are possible in light of the above teachings, and the disclosure may be practiced otherwise than as specifically described.

The invention claimed is:

1. A sensor assembly comprising:
   a housing including an outlet;
   a sensor window, the sensor window fixed relative to the housing, the outlet aimed to direct air across the sensor window;
   a flap rotatably coupled to the housing at the outlet; and
   a deflector covering the flap, the flap disposed between the outlet and the deflector and rotatable from a first position extending across the outlet toward the deflector to a second position;
   the deflector and the flap defining an air flow passage between the deflector and the flap; and
   the housing and the flap defining a second air flow passage, the flap being between the air flow passage and the second air flow passage.

2. The sensor assembly of claim 1, further comprising a member fixed to the housing and positioned to limit movement of the flap toward the deflector.

3. The sensor assembly of claim 1, further comprising a plurality of flaps including the flap, the flaps each being rotatable toward and away from the deflector.

4. The sensor assembly of claim 3, wherein the outlet is elongated parallel to the sensor window alongside the sensor window in a direction of elongation, and the flaps are arranged in series along the direction of elongation of the outlet.

5. The sensor assembly of claim 4, wherein the flaps are spaced from each other along the direction of elongation.

6. The sensor assembly of claim 3, wherein the flaps are rotatable independently of each other.

7. The sensor assembly of claim 1, wherein the flap includes vanes extending from an external surface toward the deflector.

8. The sensor assembly of claim 7, wherein the outlet is elongated parallel to the sensor window alongside the sensor window in a direction of elongation, and the vanes are elongated perpendicular to the direction of elongation of the outlet.

9. The sensor assembly of claim 7, wherein the flap includes second vanes extending from an internal surface away from the deflector.

10. The sensor assembly of claim 7, wherein the vanes are triangular in cross section.

11. The sensor assembly of claim 1, wherein the air flow passage extends from a first end of the deflector to a second end of the deflector.

12. The sensor assembly of claim 11, wherein the flap is between the first end and the second end of the deflector.

13. The sensor assembly of claim 11, wherein the outlet of the housing is between the first end and the second end of the deflector.

14. The sensor assembly of claim 11, wherein the deflector extends from the first end toward the sensor window to the second end.

15. The sensor assembly of claim 11, further comprising a base, the housing rotatably coupled to the base to rotate about an axis, the second end of the deflector radially inward of the first end of the deflector relative to the axis.

16. The sensor assembly of claim 15, wherein the first end of the deflector is spaced from the housing and is forward of the second end in a direction of rotation of the housing relative to the base.

17. The sensor assembly of claim 15, wherein the first end of the deflector is spaced from the housing to direct air into the airflow passage when the housing rotates relative to the base.

18. The sensor assembly of claim 1, wherein the housing includes a cylindrical panel, and the sensor window is recessed from the cylindrical panel.

19. The sensor assembly of claim 18, wherein the housing includes a recess panel extending radially inward from the cylindrical panel toward the sensor window, and the recess panel includes the outlet.

20. The sensor assembly of claim 18, wherein the outlet and the flap are elongated parallel to an axis defined by the cylindrical panel.

* * * * *